(12) United States Patent
Hsieh

(10) Patent No.: US 12,531,365 B2
(45) Date of Patent: Jan. 20, 2026

(54) ASSEMBLED WATERPROOF AND DUSTPROOF STRUCTURE FOR A CHARGING DEVICE

(71) Applicant: PHIHONG TECHNOLOGY CO., LTD., Taoyuan (TW)

(72) Inventor: Cheng-Yi Hsieh, Taoyuan (TW)

(73) Assignee: PHIHONG TECHNOLOGY CO., LTD., Taoyuan (TW)

( * ) Notice: Subject to any disclaimer, the term of this patent is extended or adjusted under 35 U.S.C. 154(b) by 275 days.

(21) Appl. No.: 18/090,484

(22) Filed: Dec. 29, 2022

(65) Prior Publication Data

US 2023/0163516 A1    May 25, 2023

(30) Foreign Application Priority Data

Nov. 25, 2022   (TW) .................................. 111145314

(51) Int. Cl.
*H01R 13/506* (2006.01)
*H01R 13/52* (2006.01)
*H02J 7/00* (2006.01)

(52) U.S. Cl.
CPC ....... *H01R 13/5213* (2013.01); *H01R 13/506* (2013.01); *H01R 13/5216* (2013.01); *H02J 7/0042* (2013.01)

(58) Field of Classification Search
None
See application file for complete search history.

(56) References Cited

U.S. PATENT DOCUMENTS

| | | | |
|---|---|---|---|
| 6,033,247 A * | 3/2000 | Gregory, II | H01R 13/6315 439/247 |
| 10,429,898 B2 * | 10/2019 | Yoshioka | G06F 1/1656 |
| 10,770,830 B2 * | 9/2020 | Zhan | H01R 13/5213 |
| 2014/0080334 A1 * | 3/2014 | Tetsuya | H01R 13/5213 439/136 |

* cited by examiner

*Primary Examiner* — Tho D Ta
(74) *Attorney, Agent, or Firm* — Chih Feng Yeh; Yongjean Consulting Inc.

(57) ABSTRACT

An assembled waterproof and dustproof structure for charging devices, which includes a charging device casing with a first opening, a cable cover assembly including a base provided with an USB connection interface and an accommodating space, a bracket structure with a second opening, and a cover covering the USB connection interface to form a waterproof and dustproof protective cover. The first opening, the USB connection interface and the second opening are aligned with each other. The cable cover assembly, the charging device casing and the bracket structure utilize a set of snap-type components respectively disposed on the cable cover assembly and the bracket structure to form a waterproof and dust-proof snap-fit structure that closely fits in sequence from outside to inside.

9 Claims, 5 Drawing Sheets

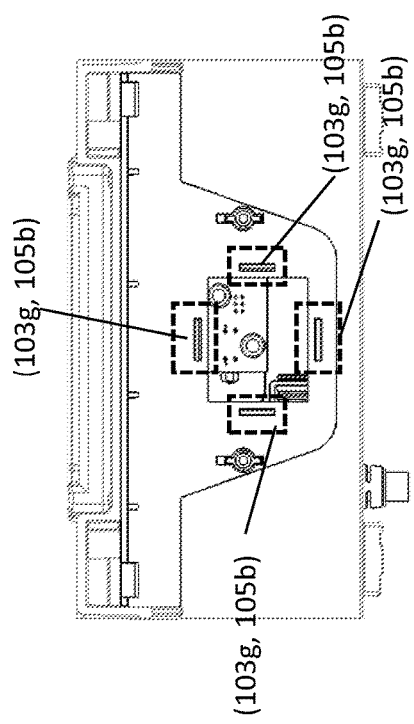
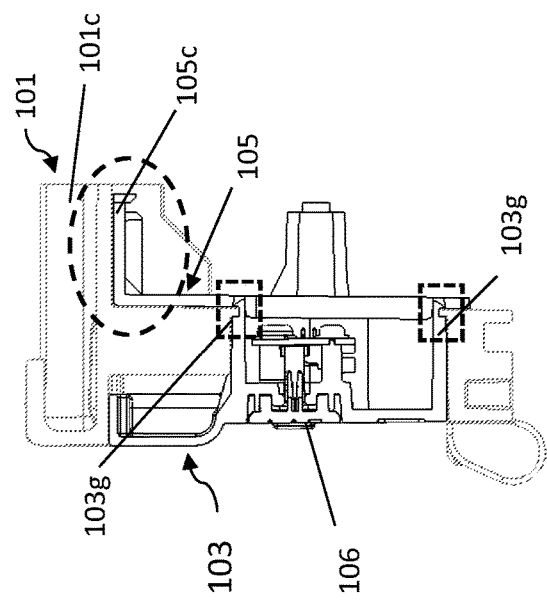
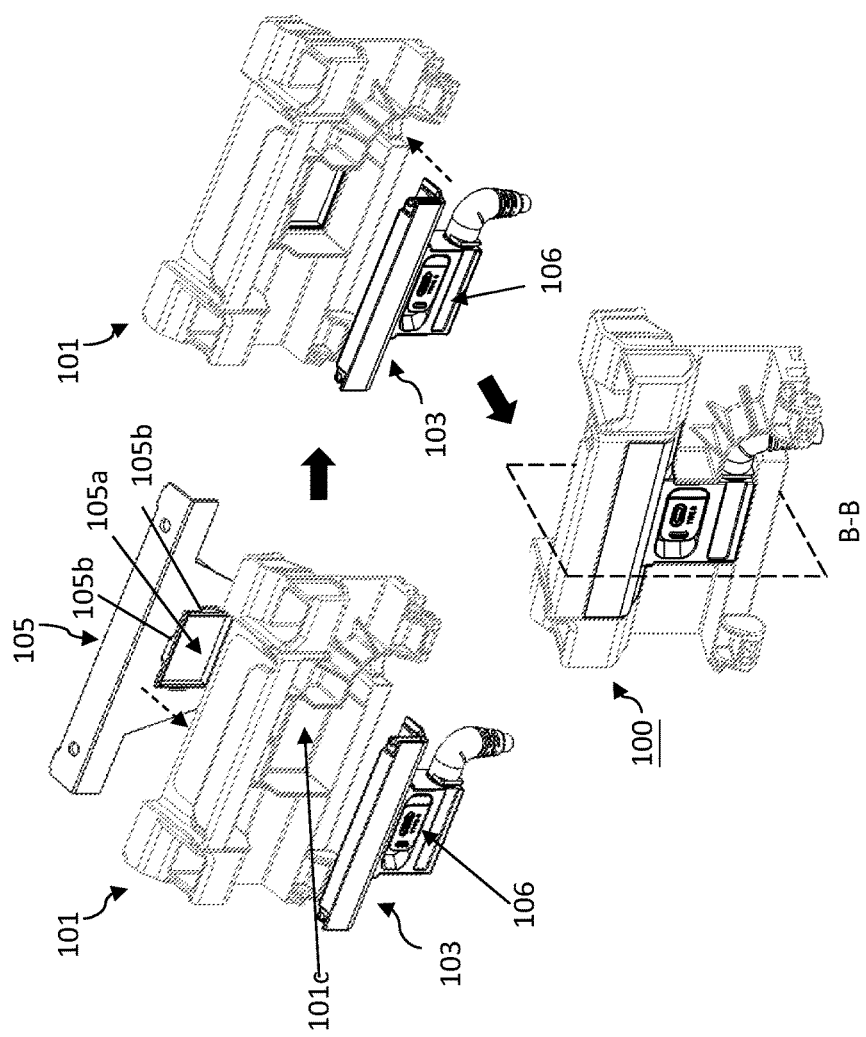

ASSEMBLED WATERPROOF AND DUSTPROOF STRUCTURE FOR A CHARGING DEVICE

CROSS-REFERENCE STATEMENT

The present application is based on, and claims priority from, Taiwan Patent Application Serial Number 111145314, filed Nov. 25, 2022, the disclosure of which is hereby incorporated by reference herein in its entirety.

BACKGROUND

Technical Field

The present invention relates to technology field of assembled structure for charging devices, and more particularly, an assembled waterproof and dustproof structure for a charging device.

Related Art

With the development of science and technology, more and more types of electronic products are announced and widely used in people's daily life. At present, most electronic products or power tools have equipped with a USB interface for charging or connecting and communicating with other electronic computing devices. The charging devices that provide power for these electronic products or power tools also need to be charged through the corresponding USB ports.

When the charging device is in use, the charging or communication with other electronic devices is performed through the USB interface, which is the weak spot of the entire device being waterproof and dustproof. In order to prevent the charging device from malfunctioning due to moisture or dust entering through the USB interface, a USB protective cover is generally designed to cover the USB interface.

To solve this issue, U.S. patent Ser. No. 10/770,830 B2 proposed a USB cover connecting structure for an electronic product, which includes a USB cover, covering a USB port of an electronic product, and disposed on a case of the electronic product. A first extending part and a second extending part are disposed on opposite ends of the USB cover, and a first gap and a second gap are formed between the first extending part, the second extending part, and sidewalls of the USB cover.

CN Patent number 201766226 U proposed a USB cover, which comprises holder and the cover that is arranged on the holder, the cover protrudes towards the holder direction and is extended with limit column, the limit column end is provided with limit stop, the holder is provided with the clamping breach, the limit column is arranged in the clamping breach, and the cover is positioned at one side of the clamping breach, and the limit stop is positioned at the opposite side of the clamping breach.

Although the above prior arts disclosed that the USB cover can achieve a dustproof effect, it does not disclose specific waterproof measures or structures.

However, it is important and indispensable to provide a firmed and tightly sealed dustproof and waterproof structure for the casing of a charging device to supply electric power to electronic products or electric tools.

SUMMARY

In view of the above problems, an assembled waterproof and dustproof structure for a charging device, which includes a charging device casing with a first opening, a cable cover assembly including a base provided with an USB connection interface and an accommodating space, a bracket structure with a second opening, and a cover covering the USB connection interface to form a waterproof and dustproof protective cover. The first opening, the USB connection interface and the second opening are aligned with each other. The cable cover assembly, the charging device casing and the bracket structure utilize a set of snap-type components respectively disposed on the cable cover assembly and the bracket structure to form a waterproof and dust-proof snap-fit structure that closely fits in sequence from outside to inside.

In one preferred embodiment, the set of snap-type components includes: a plurality of snap hooks disposed on inner side of the cable cover assembly and located around the USB connection interface; a plurality of slots disposed on corresponding locations around the second opening of the bracket structure, wherein the plurality of snap hooks buckled on the plurality slots to form snap-fit structure.

In one preferred embodiment, the cover includes a rubber cover body with a plug structure, a cylinder extends outward from the rubber cover body, and end of the cylinder has a limit stop portion, and the plug structure has a plurality of waterproof ring.

In one preferred embodiment, the cover is fixed on the USB connection interface by the plug structure to block external dust and moisture.

In one preferred embodiment, the cover is rotationally connected to the USB connection interface through an elliptical slot from outside of the cable cover assembly.

In one preferred embodiment, the USB connection interface is electrically coupled to a USB circuit board assembly including a USB connector and a corresponding driving circuit.

In one preferred embodiment, the USB circuit board assembly is fixed on an inner side of the cable cover assembly, and the USB connector penetrates the USB connection interface through a USB opening provided in the USB connection interface.

In one preferred embodiment, the accommodating space provided on the base of the cable cover assembly is used for accommodating externally connected DC power cords and the USB circuit board assembly.

In one preferred embodiment, the USB circuit board assembly is electrically connected to battery pack and its peripheral circuit disposed in the charging device casing through the first opening and the second opening.

In one preferred embodiment, the charging device casing further comprises an embedded groove disposed on outer side thereof for accommodating the DC power cords.

BRIEF DESCRIPTION OF THE DRAWINGS

The components, characteristics and advantages of the present invention may be understood by the detailed descriptions of the preferred embodiments outlined in the specification and the drawings attached:

FIG. 4(a) is a schematic diagram showing the assembly steps of the cable cover assembly, the charging device casing and the bracket structure proposed by the present invention.

FIG. 4(b) shows a rear view of the assembled waterproof and dustproof structure for a charging device according to one embodiment of the present invention.

FIG. 4(c) shows a cross-sectional view of the assembled waterproof and dustproof structure for a charging device according to one embodiment of the present invention.

DETAILED DESCRIPTION

Some preferred embodiments of the present invention will now be described in greater detail. However, it should be recognized that the preferred embodiments of the present invention are provided for illustration rather than limiting the present invention. In addition, the present invention can be practiced in a wide range of other embodiments besides those explicitly described, and the scope of the present invention is not expressly limited except as specified in the accompanying claims.

The purpose of the present invention is to provide an assembled waterproof and dustproof structure for a charging device.

In order to achieve the above object, the present invention utilizes a set of snap-type components to connect a cable cover assembly with a waterproof and dustproof cover outside the housing of the charging device and a bracket structure located inside the housing, and develop a new opening and closing structure design at the USB interface to increase space to install USB interface related PCB circuit board and DC cords. The casing of the overall charging device can reduce the use of screws and increase the internal space, and has the functions of waterproof and dustproof.

Figure 1A:
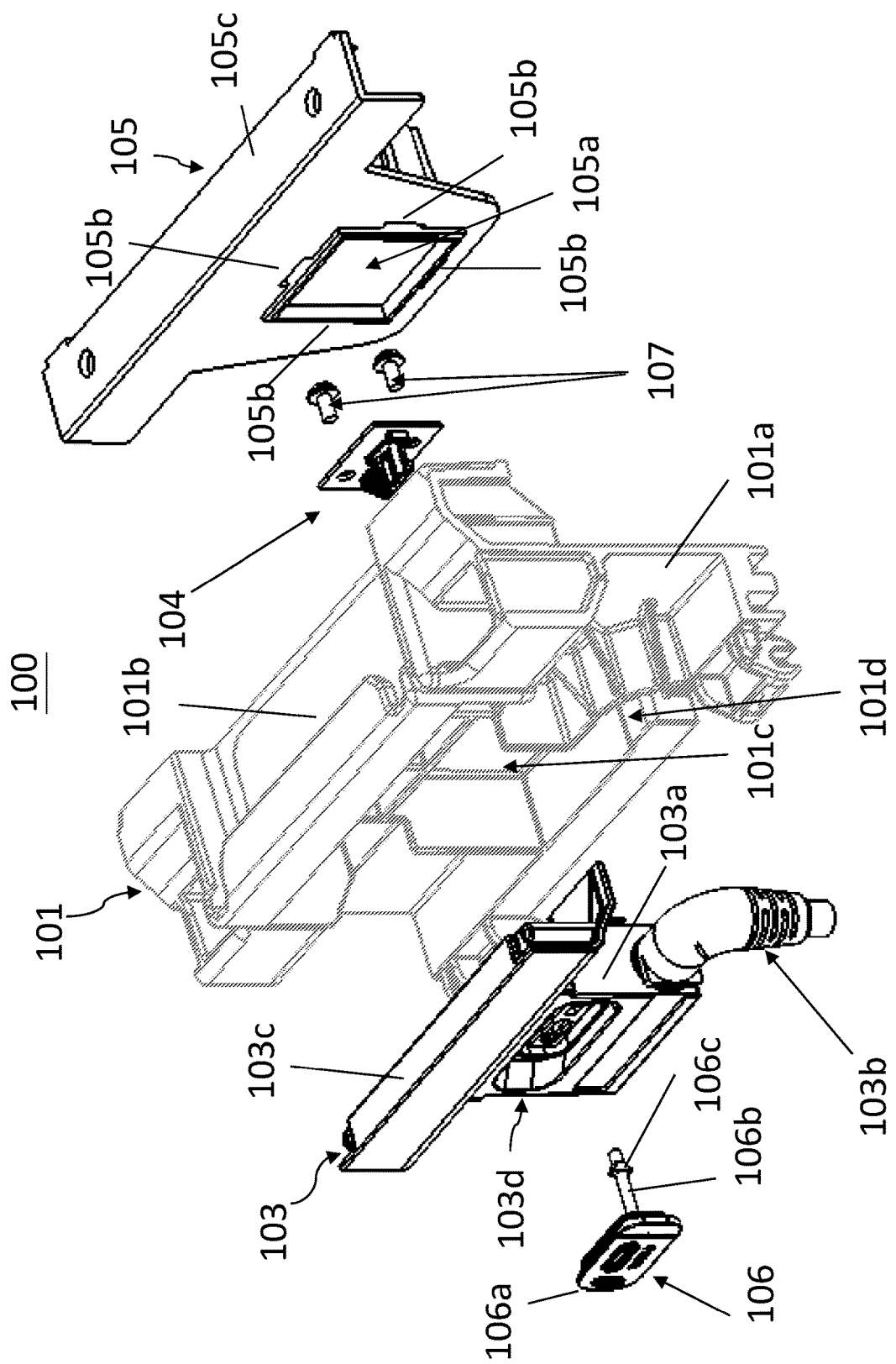
FIG. 1(a) illustrates an exploded schematic diagram of the assembled waterproof and dustproof structure for a charging device according to one aspect of the present invention.
Figure 1C:
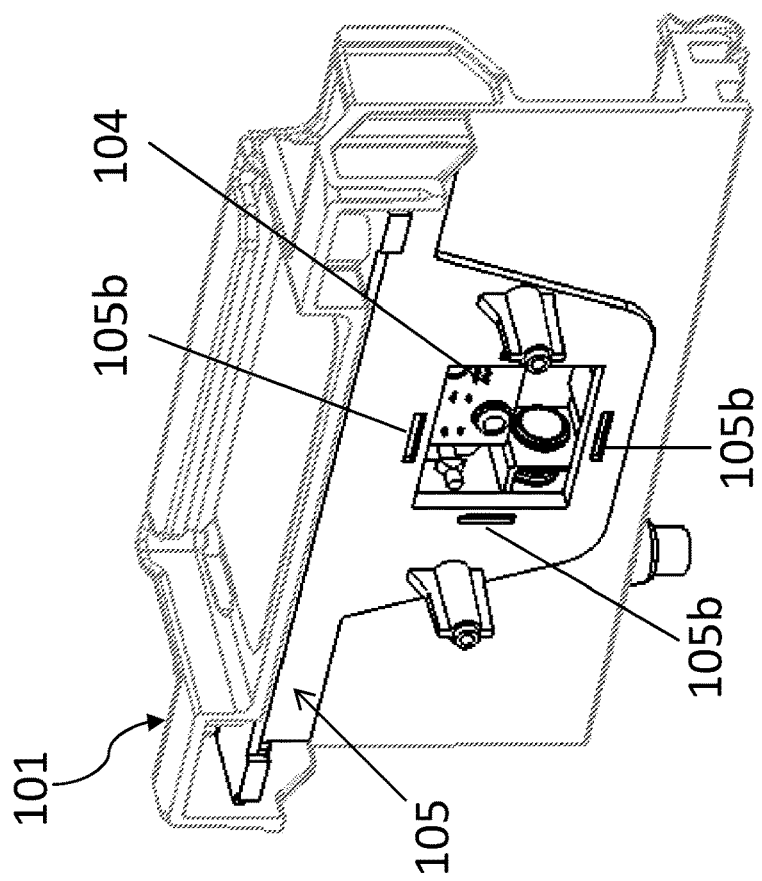
FIGS. 1(b)-1(c) respectively show the combined diagrams of the assembled waterproof and dustproof structure for a charging device from different viewing angles according to one aspect of the present invention.
Figure 1B:
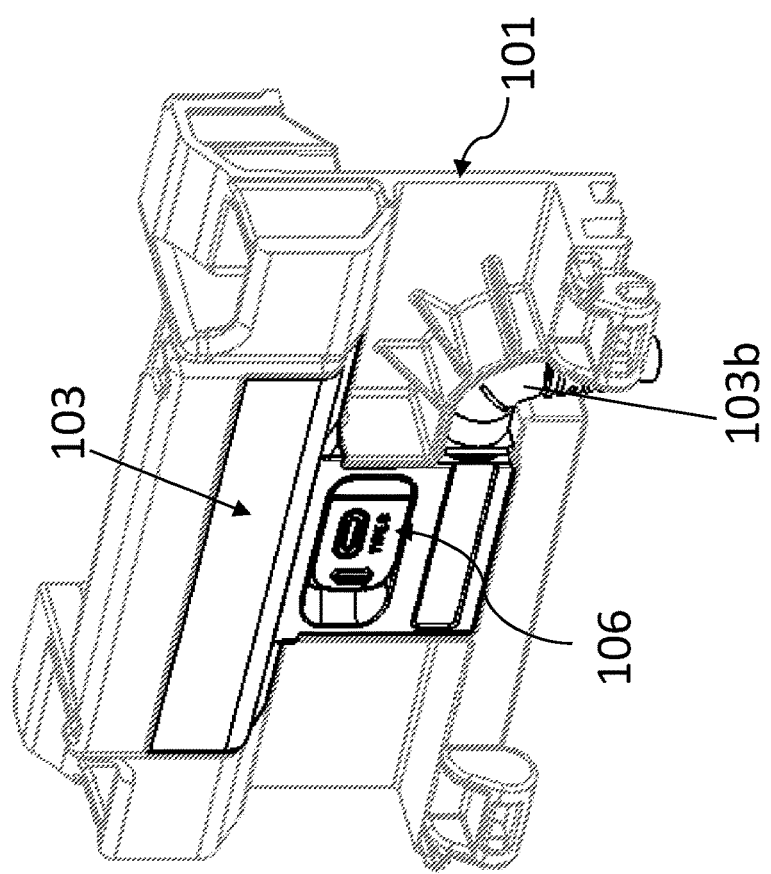

FIG. 1(a) illustrates an exploded schematic diagram of the assembled waterproof and dustproof structure for a charging device according to one aspect of the present invention. Please also refers to FIGS. 1(b)-1(c), which respectively show the combined diagrams of the assembled waterproof and dustproof structure for a charging device from different viewing angles. Buckle-type components are used to couple the cable cover assembly 103 having waterproof and dustproof cover located outside the charging device casing 101 and a bracket structure 105 inside the charging device casing 101. The buckle-type components (not shown) are disposed on the inner side of the cable cover assembly 103. The waterproof and dustproof cover is a rubber USB outer cover 106.

As shown in FIG. 1(a), the cable cover assembly 103 includes a base 103a, and the base 103a has an accommodating space for accommodating an externally connected DC power cord 103b and the USB PCB circuit board assembly 104, the base 103a also has an extended alignment connection portion 103c for aligning the charging device casing 101, and the base 103a is disposed with a USB connection interface 103d for connecting a USB PCB circuit board assembly 104 in an accommodating space inside the device casing 101 and a rubber USB cover 106 snap-sealed from the outside.

In one embodiment, the USB connection interface 103d is disposed with a USB port and an oval slot, and the USB port is used for accommodating the USB connector installed on the USB PCB circuit board assembly 104. The oval slot is used for rotationally connecting the rubber USB cover 106, which is waterproof and dustproof.

In one embodiment, the buckle-type components disposed on the inner side of the cable cover assembly 103 are a plurality of snap hooks, where the snap hooks are arranged around the USB connection interface 103d.

In one embodiment, the USB PCB circuit board assembly 104 includes a USB connector and a corresponding driving circuit.

In one embodiment, the externally engaged rubber USB cover 106 includes a rubber cover body 106a having a plug structure and a cylinder 106b extending outward from the rubber cover body 106a, and the end of the cylinder has a limit stop portion 106c. The plug structure includes a plurality of waterproof rings.

In one embodiment, the USB PCB circuit board assembly 104 is fixed to the inner side of the USB connection interface 103d of the cable cover assembly 103 through a plurality of screws 107.

Referring to FIG. 1(a), the portion of the charging device casing 101 that is engaged with the cable cover assembly 103 and the bracket structure 105 at least includes: a casing 101a, an outer cover platform 101b extends from the casing 101a and a square opening 101c disposed on the casing 101a. The USB PCB circuit board assembly 104 can be electrically connected to the battery pack and its peripheral circuits disposed in the casing 101a through the square opening (the first square opening) 101c and the second square opening 105a.

Referring to FIG. 1(a), the portion of the charging device casing 101 assembled with the cable cover assembly 103 and the bracket structure 105 further includes an embedded groove 101d (disposed in the outside) for embedding the cable cover assembly 103 including a DC cord 103b.

According to the embodiment of the present invention, when the charging device casing 101 is assembled with the cable cover assembly 103, the alignment connecting portion 103c of the cable cover assembly 103 and the embedded groove 101d of the charging device casing 101 can be used to align the charging device casing 101 and the cable cover assembly 103, enabling that the USB connection interface 103d of the cable cover assembly 103 can be aligned with the square opening (first square opening) 101c of the charging device casing 101. The alignment connecting portion 103c of the cable cover assembly 103 is aligned with and bears against the outer cover platform 101b of the charging device casing 101 during assembly.

Referring to FIG. 1(a), the bracket structure 105 is disposed with a square through hole (second square opening) 105a, and a plurality of corresponding slots 105b are arranged around it. The bracket structure 105 has an L-shaped profile.

How to use snap-type components to connect the cable cover assembly 103 with the waterproof and dustproof cover and the bracket structure 105 located outside the charging device casing 101 will be described in the following paragraphs.

Figure 2B:
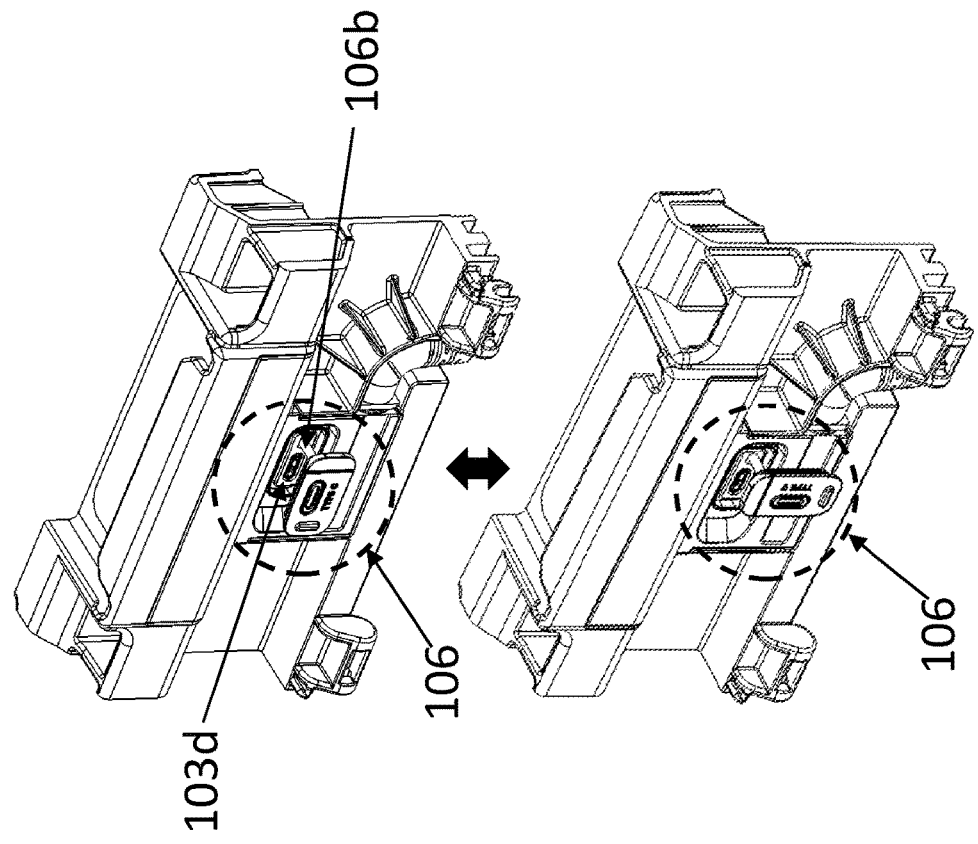
FIGS. 2(a)-2(b) respectively show the combined diagrams corresponding to the closed state and the open state of the rubber USB cover proposed by the present invention.
Figure 2A:
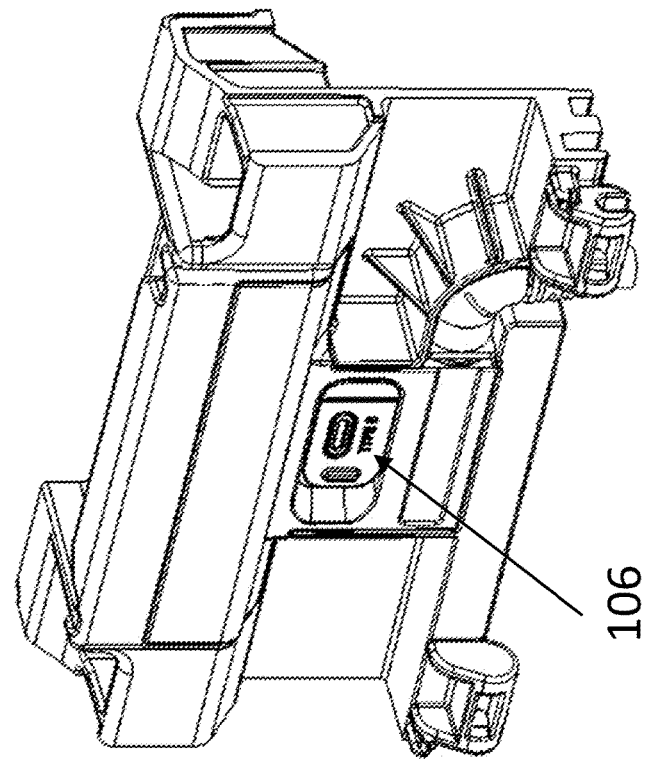

FIGS. 2(a)-2(b) respectively show the combined diagrams of the assembled waterproof and dustproof structure for a charging device corresponding to the closed state and the open state of the rubber USB cover proposed by the present invention.

FIG. 2(a) shows that the rubber USB cover 106 is inserted into the oval slot of the USB connection interface 103d through its cylinder 106b (refer to FIG. 2(b)), and then is buckled by the plug structure of the rubber USB cover 106 to fix on the USB connection interface 103d for blocking external dust and moisture.

FIG. 2(b) shows the open state of the rubber USB cover 106, and the top view of FIG. 2(b) shows that the rubber USB cover 106 is pulled outward from the closed state, because the cylinder 106b has a certain length, the rubber USB cover 106 may not be immediately separated from the USB connection interface 103d; the lower diagram of FIG. 2(b) shows that the rubber USB cover 106 is pulled outward and then rotated 90 degrees. Due to the design of the limit stop 106c at the end thereof, the limit stop 106c can be caught by the oval slot of the USB connection interface 103d and the rubber USB cover 106 will not fall off.

Figure 3:
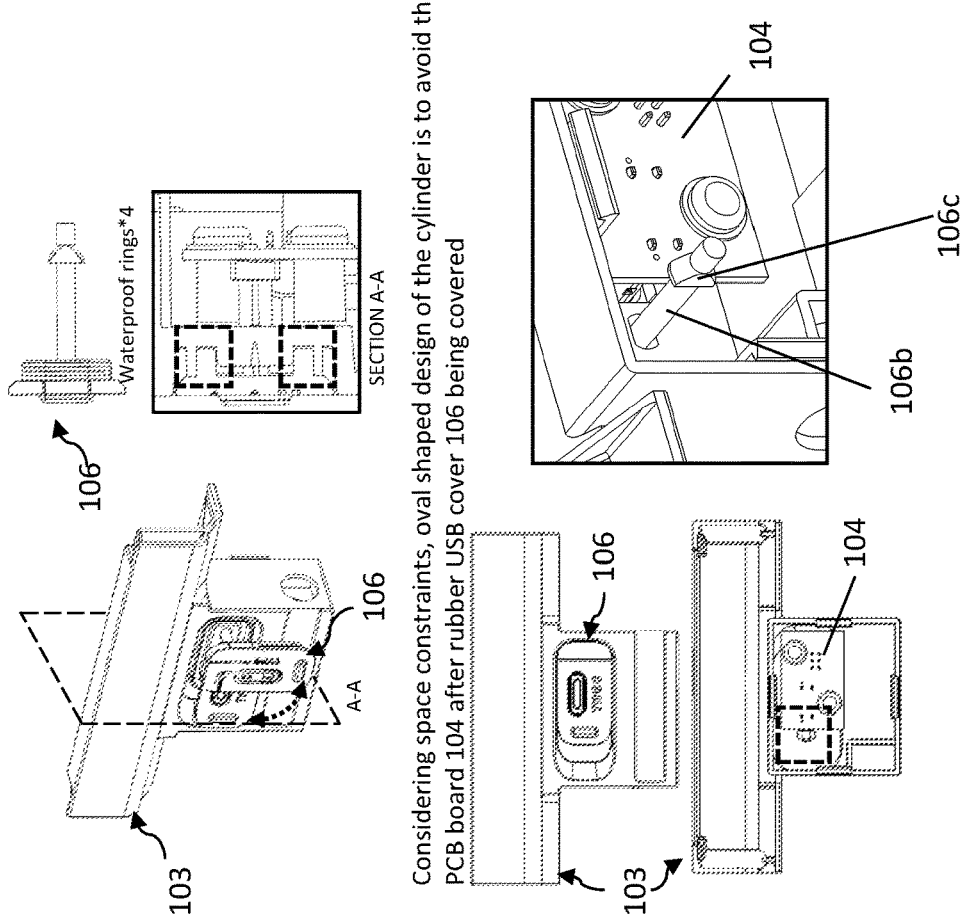
FIG. 3 is a schematic diagram showing the assembly steps of the rubber USB outer cover of the present invention installed on the cable cover assembly.
Figure 3:
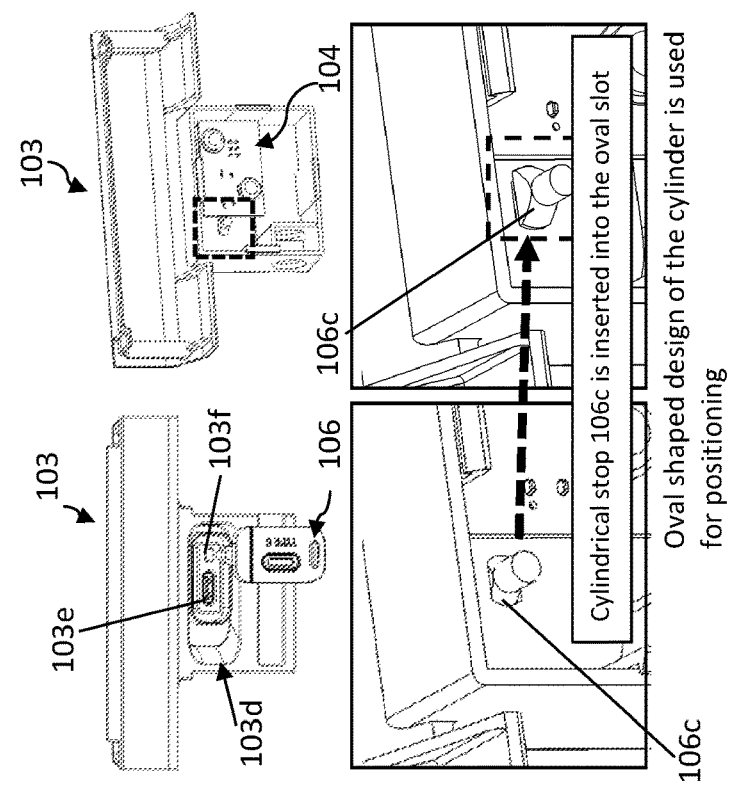

FIG. 3 shows the assembly steps of the rubber USB cover 106 being mounted on the cable cover assembly 103, first of all, as shown in FIG. 1, the USB PCB circuit board assembly 104, including the USB connector and the corresponding driving circuit, is fastened to the inner side of the cable cover assembly 103 by screws, and the USB connector is passed through the USB port of the connection interface 103d, wherein an oval slot 103f is disposed beside the USB port 103e of the USB connection interface 103d; next (step 1), the cylinder 106b of the rubber USB cover 106 is inserted into the oval slot 103f beside the USB port 103e from the limit stop 106c at the end, wherein the limit stop 106c on the cylinder is of oval-shaped design for enabling it to pass through the oval slot 103f in a specific direction, and in the remaining directions the limit stop 106c will be stuck by the oval slot 103f, and the limit stop 106c on the cylinder is designed to be used for positioning; in the next step (step 2), the rubber USB outer cover 106 is rotated 90 degrees to cover, and the way of fixing it is to use the plug (4-layer waterproof ring) of the rubber USB cover 106 to fasten and seal. Since the cylinder 106b of the rubber USB cover 106 is designed to be off-center and has an oval limit stop 106c, when the rubber USB cover 106 is closed, the oval limit stop 106c can pass the USB PCB circuit board assembly 104, and this configuration can be used in designs with space constraints.

Finally, the assembly method of the cable cover assembly 103, the charging device casing 101 and the bracket structure 105 will be described. Please refer to FIG. 4(a) for details. Following the description in the previous paragraph, after the cable cover assembly 103 and the rubber USB outer cover 106 are assembled, that is, after step 1 and step 2 are completed; in step 3, the bracket structure 105 is coupled to the charging device casing 101 (inside it), and the way of engaging is through the alignment platform 105c of the bracket structure 105 against the inner lower edge of the outer cover platform 101c of the charging device casing 101, then positioned and fixed by screws, so that the square through hole (second square opening) 105a of the bracket structure 105 is aligned with the square opening (first square opening) 101c of the charging device casing 101; the size of the first square opening 101c is larger than that of the second square opening 105a. After the bracket structure 105 is engaged in the charging device casing 101, the plurality of slots 105b disposed around the second square opening 105a can be exposed to the first square opening 101c; next, the cable cover assembly 103 is buckled to a plurality of slots 105b disposed on the bracket structure 105 through the first square opening 101c by a plurality of snap hooks 103g disposed on the inner side of the cable cover assembly 103 surround the corresponding positions of the USB connection interface 103d to form a tight fitted waterproof and dustproof buckle structure 100 that engages the cable cover assembly 103, the charging device casing 101 and the bracket structure 105 in sequence from outside to inside.

FIG. 4(b) is a rear view of the assembled waterproof and dustproof structure 100 for a charging device, and the figure shows that a plurality of snap hooks 103g are correspondingly buckled to a plurality of slots 105b.

FIG. 4(c) is a cross-sectional view of FIG. 4(a) along the B-B direction, in which a plurality of snap hooks 103g are shown to be engaged with a plurality of corresponding slots 105b of bracket structure 105; the figure clearly shows that when the plurality of snap hooks 103g are engaged with the corresponding plurality of slots 105b, the alignment platform 105c of the bracket structure 105 is against the bottom of the outer cover platform 101c of the charging device casing 101, thereby improving the strength of overall structure, enabling that the USB interface can be supported by the structure, and the assembled structure is not easily loosen after multiple plugging and unplugging.

According to the embodiment of the present invention, when the tight fitted waterproof and dustproof buckle structure 100 is formed, which engages the cable cover assembly 103, the charging device casing 101 and the bracket structure 105 in sequence from the outside to the inside, the first square opening 101c of the charging device casing 101 is aligned with the second square opening 105a of the bracket structure 105 and the USB connection interface 103d of the cable cover assembly 103.

The waterproof and dustproof buckle structure design proposed by the present invention has the advantages of reducing the use of screws, simplifying the mold design and improving the assembly strength.

While various embodiments of the present invention have been described above, it should be understood that they have been presented by a way of example and not limitation. Numerous modifications and variations within the scope of the invention are possible. The present invention should only be defined in accordance with the following claims and their equivalents.

What is claimed is:

1. An assembled waterproof and dustproof structure for charging devices, said structure comprising:
 a charging device casing with a first opening;
 a cable cover assembly including a base provided with a USB connection interface and an accommodating space;
 a bracket structure with a second opening;
 a cover covering said USB connection interface to form a waterproof and dustproof protective cover;
 wherein said first opening, said USB connection interface and said second opening are aligned with each other;
 wherein said cable cover assembly, said charging device casing and said bracket structure utilize a set of snap-type components respectively disposed on said cable cover assembly and said bracket structure to form a waterproof and dustproof snap-fit structure that closely fits in sequence from outside to inside;
 wherein said charging device casing disposed between said cable cover assembly and said bracket structure; and
 wherein said charging device casing further comprises an assembled groove disposed on an outer side thereof for accommodating externally connected DC power cords.

2. The assembled waterproof and dustproof structure for charging devices of claim 1, wherein said set of snap-type components includes:

a plurality of snap hooks disposed on inner side of said cable cover assembly and located around said USB connection interface;

a plurality of slots disposed on corresponding locations around said second opening of said bracket structure, wherein said plurality of snap hooks buckled on said plurality slots to form snap-fit structure.

3. The assembled waterproof and dustproof structure for charging devices of claim 1, wherein said cover includes a rubber cover body with a plug structure, a cylinder extends outward from said rubber cover body, and end of said cylinder has a limit stop portion.

4. The assembled waterproof and dustproof structure for charging devices of claim 3, wherein said cover is fixed on said USB connection interface by said plug structure to block external dust and moisture.

5. The assembled waterproof and dustproof structure for charging devices of claim 3, wherein said cover is rotationally connected to said USB connection interface through an elliptical slot from outside of said cable cover assembly.

6. The assembled waterproof and dustproof structure for charging devices of claim 1, wherein said USB connection interface is electrically coupled to a USB circuit board assembly including a USB connector and a corresponding driving circuit.

7. The assembled waterproof and dustproof structure for charging devices of claim 6, wherein said USB circuit board assembly is fixed on inner side of said cable cover assembly, and said USB connector penetrates said USB connection interface through a USB opening provided by the USB connection interface.

8. The assembled waterproof and dustproof structure for charging devices of claim 7, wherein said accommodating space provided on said base of said cable cover assembly is used for accommodating said externally connected DC power cords and said USB circuit board assembly.

9. The assembled waterproof and dustproof structure for charging devices of claim 8, wherein said USB circuit board assembly is electrically connected to battery pack and its peripheral circuit disposed in said charging device casing through said first opening and said second opening.

* * * * *